United States Patent [19]

Thomas

[11] 4,135,535

[45] Jan. 23, 1979

[54] INVALID WALKER APPARATUS

[75] Inventor: Morton I. Thomas, Nyack, N.Y.

[73] Assignee: Temco Products, Inc., Passaic, N.J.

[21] Appl. No.: 839,223

[22] Filed: Oct. 4, 1977

[51] Int. Cl.$^2$ ........................ F16M 13/08; A61H 3/00

[52] U.S. Cl. ........................................ 135/67; 272/70.3

[58] Field of Search .......................... 135/67; 297/5, 6; 272/70.3; 280/289

[56] References Cited

U.S. PATENT DOCUMENTS

| | | | |
|---|---|---|---|
| D. 181,957 | 1/1958 | Callahan | 297/5 X |
| 2,652,097 | 9/1953 | Warren | 272/70.3 |
| 3,422,830 | 1/1969 | Cherup | 135/67 |
| 3,872,945 | 3/1975 | Hickman et al. | 297/5 X |
| 3,968,810 | 7/1976 | Thomas | 135/67 |

*Primary Examiner*—Ernest R. Purser
*Assistant Examiner*—Conrad L. Berman
*Attorney, Agent, or Firm*—Richard C. Woodbridge

[57] ABSTRACT

An improved invalid walker is provided with extra bracing between each front and rear leg so as to increase the strength of the structure. In addition to the handle section of the walker, there are two braces connecting each front leg to its respective rear leg so as to make three structural attachments between each front leg and the rear leg. The bracing structure is connected together in a unique circular manner. An additional set of hand grips may be placed on one set of the braces so as to help an invalid assume the standing position from the sitting position. The legs of the walker are splayed to improve stability. The walker has exceptional strength due to the additional bracing that exists between the front and the rear legs and the manner in which the bracing members are associated with each other.

6 Claims, 4 Drawing Figures

INVALID WALKER APPARATUS

BACKGROUND OF THE INVENTION

1. Field of the Invention

This invention relates to the invalid walker art.

2. Description of the Prior Art

There are a variety of invalid walkers that are well known to those of ordinary skill in the art. The inventor of the device described herein holds a number of patents directed towards invalid structures such as walkers.

Over the years there has been a long felt need for walkers with additional strength and stability. An invalid walker must be strong and stable because an invalid must rely upon it as his sole source of support. In addition to strength and stability, the structure must also be light in weight and relatively inexpensive.

Invalid walkers with bracing are fairly well known. As a matter of fact, it is not uncommon to have at least one brace interconnecting each of the front and rear legs in addition to the primary attachment structure, which is typically the handle section.

Several walkers having additional braces have been manufactured by Edco, Inc., 125 South Street, Passaic, N.J. 07055. One walker is known as the Hemi-Ambulator, Catalog item No. 2123–1903 which includes a pair of front legs connected together by a continuous U-shaped member and a U-shaped bracket having downwardly turned tips which serve as additional bracing above and beyond that normally provided by the handle section of the walker. A walker of similar construction is identified in the Edco, Inc. catalogs as Item No. 2123–1931. Edco, Inc. also sells a walker, catalog Item No. 1707, having a similar base bracing structure, but including discontinuous front legs. That walker is referred to in the literature as the Dollar Stretcher Walker. A variety of folding walkers are also available from Edco. One such folding walker is Catalog Item No. 2123–1906 and another is known as the Edcomatic Folding Walker, Models No. 2123–1916 and 1917. Due to their folding nature, it is possible to effectively brace the side legs, but it is difficult, if not impossible, to connect the two front legs by an additional brace. Edco, Inc., also produces a line of economy type walkers having a substantially continuous U-shaped bracing structure which extends across the front legs as well as between the front legs and the back legs. These economy walkers known as Models No. 2123–1801, 2123–1721 and 2123–1701 all include substantially continuous U-shaped additional bracing in which the intermediate section between the front legs may also be employed for support purposes. Of note also is the delux model No. 2123–1901 which includes a U-shaped downwardly turned bottom bracing structure.

Similar to the Edco Model No. 2123–1931 is the Sci-O-tech Deluxe Adjustable "U" Line Adult Walker, catalog No. 86,002. It includes a U-shaped pair of front legs, a continuously U-shaped pair of rear legs and another U-shaped member which provides additional bracing for the front and back legs and across the two front legs.

One advantage of the present invention is that the additional bracing may include a pair of grips located below the two normal top grips so as to assist an invalid in assuming the standing position from a sitting position. There are some walkers known to those of ordinary skill in the art which include an additional hand grip however, the additional grip is usually found at a different location on the structure. Such walkers are used, for example, in assisting invalids when they go up and down stairs. Typical of such walkers is the Edco Multipurpose Stair Walker, Catalog No. 1911. The Edco Multipurpose Stair Walker includes a pair of handles extending from the rear legs of the walker in such a manner that an invalid can place more weight on the rear legs when negotiating a stairway.

In addition to the basic walker structure, it is also known to add certain features to make the walkers more adaptable to the surroundings in which they are used. For example, it is not uncommon to include adjustable feet portions on the legs of the walker so that they can be adjusted upwardly or downwardly.

SUMMARY OF THE INVENTION

Briefly described, the invention comprises an improved invalid walker having additional bracing between the front and rear legs so as to increase the strength of the structure. The frame of the walker includes a pair of front legs connected together in a generally U-shaped fashion. The rear legs of the walker are also connected together in a generally continuous U-shaped fashion and attached at the intermediate section thereof to the intermediate section of the U-shaped front leg portion. Each front and rear leg is further connected together by two braces. The braces are part of an overall substantially structurally continuous circular member which is attached at at least one point to the rear legs and at at least two distinct points to each of said front legs. The circular member includes an upper and lower part each in turn having a generally U-shaped structure and being attached to the leg in such a fashion that the tips of the upper and lower portions almost abutt each other. The tips are then joined together by an intermediate tubing section found inside of the hollow tips. The intermediate tubing section is riveted to the rear legs of the walker through the tips of both the upper and lower sections. The legs of the walker are splayed so as to provide additional stability.

These and other featues of the invention will be more fully appreciated with reference to the following drawings.

DETAILED DESCRIPTION OF THE PREFERRED EMBODIMENT

Figure 1:
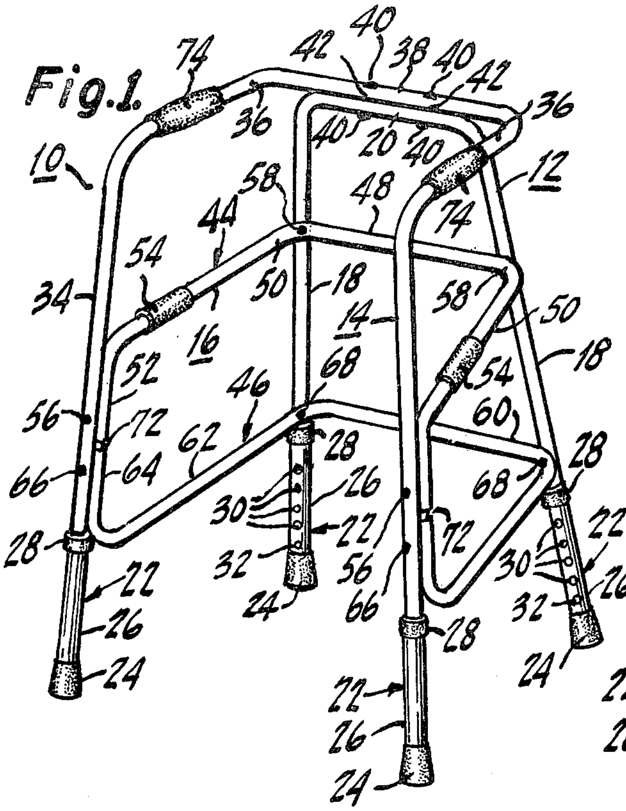
FIG. 1 is a rear perspective view of the invalid walker apparatus according to the preferred embodiment thereof.

During the course of this description like numbers will be used to indicate like elements according to the different view of the invention.

The invalid walker 10 essentially comprises a U-shaped front leg structure 12, a U-shaped, bent rear leg structure 14, and a structurally endless circular bracing member 16 interconnecting the front leg structure 12 with the rear leg structure 14. The U-shaped front leg structure 12 includes a pair of front leg members 18 interconnected by an intermediate section 20. Front legs 18 and intermediate section 20 are part of a continuous U-shaped piece of aluminum tubing. The front leg members 18 are terminated in a foot section 22 which includes a rubberized foot pad 24, a sleeve 26 which telescopes over the leg member 18 and a shock absorbing collar 28 which serves to minimize vibration. Telescoping sleeve 26 includes a plurality of locking apertures 30 and at least one spring-loaded locking pin 32. By depressing the locking pin 32 and relocating it in any one of the locking holes 30 it is possible to adjust the effective height of any one of the leg members 18.

The U-shaped rear structure 14 includes a pair of rear legs 34, a substantially horizontal handle section 36, and an intermediate section 38. Rear legs 34, handle section 36 and intermediate section 38 are continuously connected together from one side to the other so as to form a bent U-shaped structure. Each rear leg member 34 is terminated by an adjustable foot section 22 similar to those employed on the front legs 18. A rubberized grip 74 surrounds the handle section 36. Grip 74 is relatively substantial and intended to take a great deal of wear. The intermediate section 38 of the rear structure 14 is connected by a pair of rivets 40 to the intermediate section 20 of the front leg structure 12. The rivets 40 pass through a plastic-like washer 42 at the interface between the two intermediate sections 20 and 38. Washers 42 serve to eliminate squeek, vibration, and abrasion.

The endless circular bracing element 16 includes a first upper U-shaped brace member 44 and a second, lower U-shaped brace member 46. The upper U-shaped brace member 44 includes an intermediate section 48, a pair of brace side members 50, and a downwardly turned end section 52 attached to rear leg 34. A second handgrip 54 is attached to brace member 50. The purpose of the additional grip 54 is to assist an invalid in changing from the sitting position to the walking position. It has been found that it is easier for an invalid to start standing up by initially placing his weight upon brace grips 54. As the invalid continues to pull and push himself upward, he will move his hands from the lower grips 54 to the upper handle grips 74. The brace grips 54 are temporary in nature and therefore not as substantial and durable as the standard handle grips 74. The end section 52 of the upper brace structure 44 is attached to rear leg 34 by means of a rivet 56. A more complete understanding of this method of attachment may be had by referring to FIG. 4, as will be discussed below. The upper brace element 44 is also connected to the front legs 18 by a similar pair of rivets 58. Rivets 58 are attached to the upper brace structure 44 where the side brace member 50 meets the intermediate section brace member 48. End members 52, brace members 50, and intermediate section 48 are formed from a continuous U-shaped piece of aluminum tubing.

In a similar manner the lower brace structure 46 includes intermediate section 60, brace members 62 and upwardly turned ends 64. Lower end member 64 is attached to rear leg 34 by a rivet 66 and in the same manner that upper member 52 is attached to rear leg 34 by rivet 56. The lower structure 46 is attached to the front legs 18 by means of another distinct set of rivets 68 in the same manner that the upper brace structure 44 is attached to the front legs 18 by rivets 58. Rivets 68 are located at the junction between the intermediate section 60 and the side brace members 62. Intermediate section 60, the two side brace members 62 and the two upwardly turned end members 64 are formed from a continuous piece of aluminum tubing.

Figure 3:
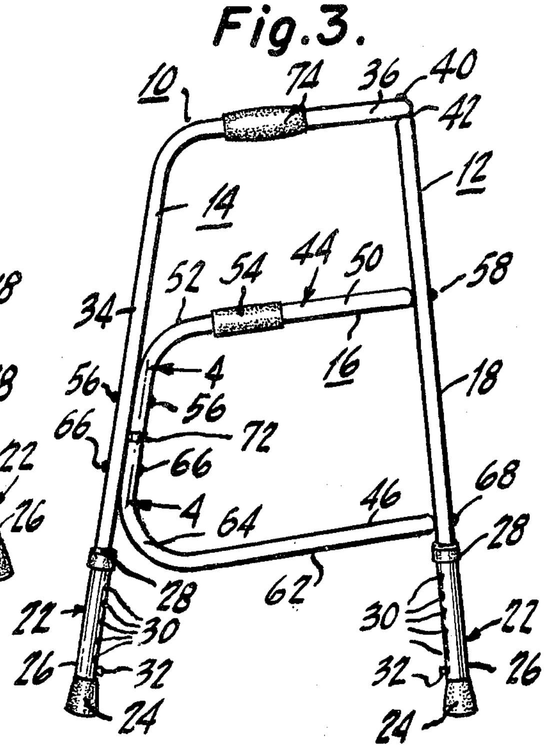
FIG. 3 is a side elevational view of the invalid walker apparatus illustrated in FIG. 1.
Figure 4:
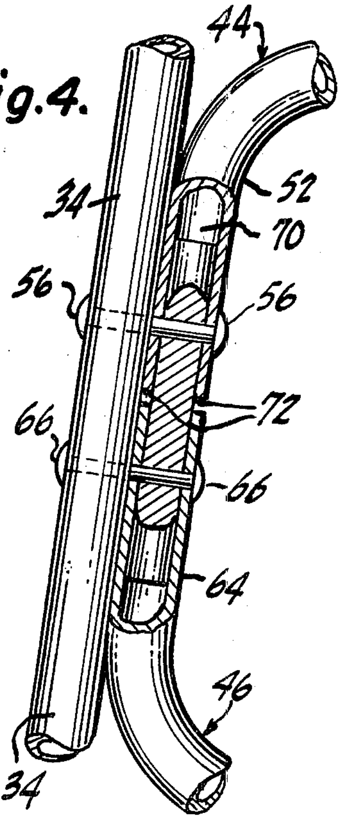
FIG. 4 is a partial cross-sectional view of the invalid walker apparatus illustrated in FIG. 3, as seen from perspective 4—4.

FIG. 4 illustrates in greater detail the way in which the upper and lower brace structures 46 form a substantially continuous circular element 16. The partial cross-sectional view of FIG. 4 describes the manner in which an interior tubular element 70 telescopes inside of the hollow downwardly facing end member 52 of the upper brace structure 44 and into the upwardly turned end member 64 of the lower brace structure 46. Rivet 56 passes through end member 52, reinforcing tubular element 70 and rear leg 34. In a similar manner, rivet 66 passes through the upwardly turned end member 64, tubular element 70 and rear leg 34. Accordingly, upper brace member 44 is structurally continuous with lower brace member 46 because it is rigidly connected thereto through rigid tubular intermediate reinforcing member 70 and rivets 56 and 66. Only a very small external gap 72 exists between end elements 52 and 64. Gap 72 is approximately 1/16" wide and has been slightly exagerated in FIGS. 1 through 4 for illustrative purposes only.

It is apparent from the foregoing that the endless circular brace structure 16 is attached at four distinct points to the front legs 18 of the walker 10. Those points are at the locations of the two upper rivets 58 and the two lower rivets 68. The continuous structure 16 is likewise attached at four points to the rear legs 34. Those four points of course correspond to the pair of upper rivets 56 and the pair of lower rivets 66. The essentially continuous nature of the circular bracing section 16 gives the walker considerably increased strength and rigidity. The increased strength and rigidity is due at least in part to the three dimensional nature of the continuous brace structure 16 and the manner in which it is attached to both the front legs 18 and the rear legs 34. In the context of this invention, element 50 can be considered a first brace and element 62 can be considered a second brace. While it is not unusual to have at least one brace in addition to a handle section in the invalid walker, the use of additional bracing similar to that described herein is believed to be otherwise unknown.

A pair of plastic-like vibration absorbing washers 42 are located between the intermediate sections 20 and 38 of the front secton 12 and the rear section 14. Washers 42 serve to eliminate the creaking that may be associated with the relative movement of intermediate section 20 with respect to intermediate section 38. Similar vibration absorbing washers are located on rivets 58 and 68 at the interface between the continuous member 16 and the front legs 18. It may also be desirable to include a set of vibration absorbing washers over rear rivets 56 and 66.

Figure 2:
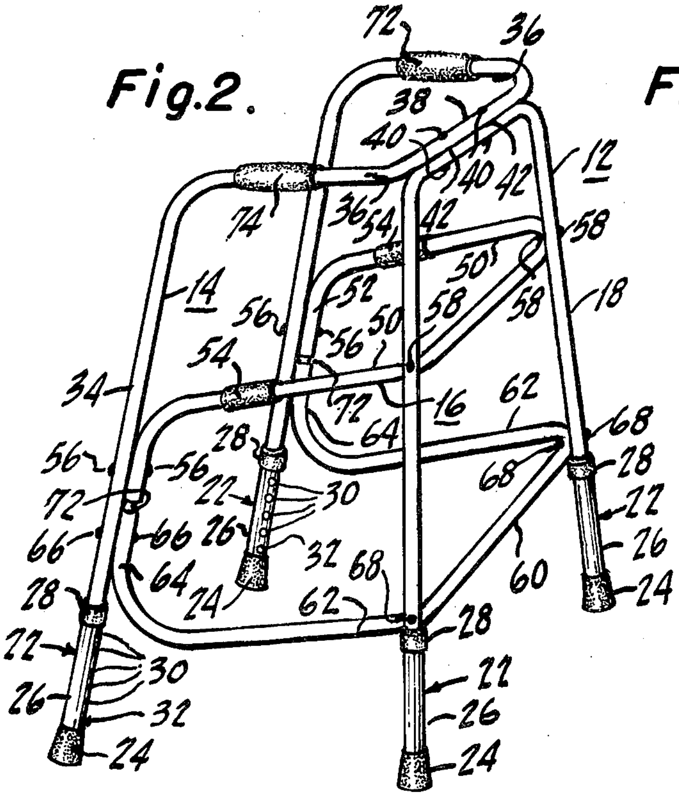
FIG. 2 is a front perspective view of the invalid walker apparatus illustrated in FIG. 1.

The stability of the walker 10 is due in large part to the outward flaring of the legs so as to create a wider base. As seen in FIG. 2 the rear legs 34 are kicked backwardly to a greater degree than is normal in these structures. In addition, the front legs are kicked forwardly and the side legs are kicked sidewardly in such a fashion as to increase the size and stability of the base. This feature can be understood by reference to the following dimensions. The distance between the handles at the top of the walker is approximately 20". The depth of the walker from the intermediate section 38 to the bend behind handles 37 is approximately 10 ½". In contrast, the distance between the foot pads 24 on the front leg sections 22 in the uncollapsed state is approximately 24"

in the front and 25" in the back. Likewise, the respective distance between the foot pads 24 in the front and in the rear is approximately 21". In the completely extended mode, the distance between the two front foot pads 24 is approximately 27 ½" and between the rear foot pads 24 is approximately 26 ½". The distance between a front foot pad 34 and the respective rear foot pad 24 is approximately 23" in the telescoped state. Also, in the telescoped state the walker stands approximately 39 ½" tall. In the most collapsed state the walker stands approximately 32 ½" tall. Therefore, there is normally 7" of travel between the most collapsed state and the most telescoped state of the walker 10. According to the preferred embodiment, there are eight locking holes 30 per leg located 1" apart so as to accommodate eight different height adjustments. However, only five locking holes 30 are shown in FIGS. 1 through 3 in order to avoid cluttering the illustration.

The walker is especially useful for tall and/or heavy individuals. It is useful for tall people because the base of the walker is exceptionally wide when the legs are fully extended. The walker is attractive to heavy individuals because of its uniquely strong bracing system.

One failure of prior art invalid walkers is that the back legs are frequently unstable. The walker of the present invention has overcome this difficulty not only through the use of a unique bracing system, but also through the use of continuous U-shaped structures which comprise the front and back legs. In many prior art walkers it was standard practice to separately weld or rivet the front legs and/or the back legs to an intermediate structure upon which the handles might be located. These rivets and weld locations can be a source of weakness. Accordingly, that particular problem has been overcome by maximizing the use of continuous pieces of tubing where possible.

In addition to exceptional strength and stability, the present invention is about as light as such a structure can be economically made. Virtually all of the larger items are formed from extruded aluminum tubing. The handles are made from a light weight yet durable plastic material. Accordingly, the ultimate product is very maneuverable even for people with severe handicaps.

While the invention has been described with reference to the preferred embodiment thereof, it will be appreciated by those of ordinary skill in the art that various modifications may be made in different parts of the apparatus without departing from the spirit and scope of the invention.

I claim:

1. An improved Invalid Walker Apparatus comprising:

a pair of front legs including a first and a second front leg respectively;

a pair of rear legs including a first and a second rear leg respectively;

a pair of first connecting means for connecting said first rear leg to said first front leg and said second rear leg to said second front leg respectively;

a first pair of grip means each attached to one of said first connecting means respectively;

a first intermediate section for connecting said first pair of connecting means together in a continuous fashion;

a second pair of connecting means for connecting said first rear leg to said first front leg and said second rear leg to said second front leg respectively, said second pair of connecting means being located below said first pair of connecting means;

a second pair of grip means each attached to one of said second pair of connecting means respectively;

a second intermediate section for continuously connecting said second pair of connecting means together, said second pair of connecting means and said second intermediate section forming a substantially U-shaped member, said U-shaped member formed by said second pair of connecting means and said second intermediate section comprising a piece of hollow metal tubing, the ends of which are bent downwardly and attached to said first and second rear legs respectively;

a third pair of connecting means for connecting said first rear leg to said first front leg and said second rear leg to said second front leg respectively, said third pair of connecting means being located below said second pair of connecting means;

a third intermediate section for continuously connecting said third pair of connecting means together, said third pair of connecting means and said third intermediate section forming a substantially U-shaped member, said U-shaped member formed by said third pair of connecting means and said third intermediate section comprising a piece of hollow metal tubing, the ends of which are bent upwardly and attached to said first and second rear legs respectively;

and, a fourth intermediate section for connecting said first and second front legs together in a continuous U-shaped fashion.

2. The apparatus of claim 1 further including:

a pair of bridging means adapted to be received in the hollow ends of the two U-shaped members formed by said second and third pairs of connecting means and the second and third intermediate members respectively, said means being such as to substantially complete a circular structure including said second and third pairs of connecting means and said second and third intermediate means.

3. The apparatus of claim 2 wherein said first and second rear legs and said first pair of connecting means and said first intermediate section comprise a continuous U-shaped piece of metallic tubing.

4. The apparatus of claim 3 wherein said first intermediate section and said fourth intermediate section are riveted together.

5. The apparatus of claim 4 wherein said second and third pair of connecting means are each connected to said first and second rear legs by rivet means which pass through one of said bridging means.

6. The apparatus of claim 5 further including foot means attached to each of said legs; and, an adjustable means associated with each foot means for modifying the effective length of each leg selectively.

* * * * *